(12) United States Patent
Adachi et al.

(10) Patent No.: US 7,020,063 B2
(45) Date of Patent: Mar. 28, 2006

(54) OPTICAL PICKUP

(75) Inventors: Tadashi Adachi, Yamagata (JP);
Hirokazu Furuse, Yamagata (JP);
Masayoshi Sugawara, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 324 days.

(21) Appl. No.: 10/419,667

(22) Filed: Apr. 21, 2003

(65) Prior Publication Data

US 2003/0201383 A1 Oct. 30, 2003

(30) Foreign Application Priority Data

Apr. 25, 2002 (JP) .............................. 2002-124196

(51) Int. Cl.
G11B 7/121 (2006.01)
G11B 7/135 (2006.01)
G02B 7/04 (2006.01)
H01J 3/14 (2006.01)

(52) U.S. Cl. ............................. 369/112.04; 369/112.05; 369/112.17; 250/216; 250/201.5

(58) Field of Classification Search ............. 369/44.23, 369/112.04, 112.05, 112.12, 112.09, 112.06, 369/112.17; 250/216, 201.5
See application file for complete search history.

(56) References Cited

U.S. PATENT DOCUMENTS 5,361,244 A * 11/1994 Nakamura et al. ........ 369/44.23
6,034,797 A * 3/2000 Ju et al. ................. 369/112.26
6,072,579 A * 6/2000 Funato ................... 369/112.12
6,195,315 B1 * 2/2001 Takahashi et al. ........ 369/44.23
6,240,053 B1 * 5/2001 Akiyama ................. 369/44.23
6,366,548 B1 * 4/2002 Ohyama ................. 369/112.04
6,876,621 B1 * 4/2005 Ohuchida et al. ....... 369/112.09

FOREIGN PATENT DOCUMENTS

JP 2001-344804 A 12/2001
JP 2002-092925 A 3/2002

OTHER PUBLICATIONS

Patent Abstracts of Japan for JP2001-344804 published Dec. 14, 2001.
Patent Abstracts of Japan for JP2002-092925 published Mar. 29, 2002.

* cited by examiner

Primary Examiner—William Korzuch
Assistant Examiner—Kim-Kwok Chu
(74) Attorney, Agent, or Firm—Darby & Darby

(57) ABSTRACT

An optical pickup comprising: a diffraction grating, a beam splitter and laser beam guiding optical components that change direction of laser beams, which are placed on a light path constituted by a semiconductor laser that emits dual wavelength laser beams and an information recording surface of an optical disk, wherein a wavelength plate is provided on a light path between said diffraction grating and said semiconductor laser so that a laser beam irradiated on the recording surface of said optical disk becomes an elliptically polarized (including circularly polarized) beam or a beam having a polarizing plane that produces an angle of 30–60 degrees relative to a radius direction.

2 Claims, 8 Drawing Sheets

(a)

(b)

OPTICAL PICKUP

FIELD OF THE INVENTION

The present invention relates to an optical pickup built into an optical disk drive for reproducing information recorded on an optically recorded medium.

BACKGROUND OF THE INVENTION

Optical pickups have been used in optical disk drives for reading or writing information from or to an optical recording medium ("optical disk") such as CD-ROM, CD-R, CD-RW, DVD-RAM, DVD-R, and DVD-RW. The optical pickup is a device for converging a laser beam emitted by a semiconductor laser, which is a light source, on a signal recording surface of an optical disk by means of an objective lens and then detecting a light bounced back from the signal recording surface by means of a light detector equipped with a photo detector ("PD"), which is a light detecting means.

FIG. 9(a) is a plan view indicating the outline of the arrangement of each optical system used on a conventional optical pickup. FIG. 9(b) is a view indicating a polarization surface of an incident light to the optical disk. FIG. 10 is a side view indicating the arrangement of each optical system used on the optical pickup shown in FIG. 9(a).

As shown in FIG. 9 and FIG. 10, the optical pickup comprises a semiconductor laser ("LD") 11 for dual wavelengths, a diffraction grating ("GRT") 12 to which the laser beam from LD 11 enters, a beam splitter ("BS") 13 for reflecting the laser beam from GRT 12, a photo detector ("PD") 17 that functions as an optical detector placed in the direction opposite to the direction of a laser beam reflecting from BS 13, a raising mirror ("MIR") 14 that reflects the reflected laser beam for BS 13 again to change its direction, a collimating lens ("CL') 15 for converging the reflected laser beam from MIR 14, and an objective lens (OL) 16 for focusing the laser beam converged by CL 15 on the signal recording surface of an optical disk 18 and irradiating it. Since MIR 14, CL 15, and OL 16 guide the laser beam on the signal recording surface of optical disk 18, and the returning beam of the laser beam from the signal recording surface to BS 13, they will be referred to as the laser beam guiding components.

The two different wavelengths of the semiconductor laser 11 are used for reading signals recorded on a DVD disk and a CD disk respectively.

In reading signals recorded on an optical disk, laser beams first enter into optical disk 18. The return laser beams from the signal reflecting surface travel again through OL 16 and CL 15, enter into and are reflected by MIR 14 into a different direction, and enter into BS 13. The return beams from the optical disk pass through BS 13, and enter into photo detector ("PD") 17 of the optical detector. PD 17 detects the change of intensities of the laser beams returning from the signal recording surface.

On a conventional optical pickup 50, as shown in FIG. 9(a), it is designed in such a way that the polarization plane of the laser beam ("polarization plane") emitted from the LD lies in a substantially horizontal direction, and the polarization plane of a spot of a laser beam that enters into the signal recording surface of optical disk 18 coincides with a radial direction 21 of optical disk 18 as shown in FIG. 9(b).

However, optical pickup 50, shown in FIGS. 9(a) and (b), as well as conventional optical pickups have problems in playing the signal recorded on optical disk 18 in that the playability deteriorates in comparison with an optical pickup having a polarization plane adjusted to a direction 52, which is tilted approximately 45 degrees.

SUMMARY OF THE INVENTION

The present invention is intended to provide an optical pickup that does not cause any deterioration of playability in reproducing information recorded on various types of optical disks.

In order to solve the above-mentioned problem, the present invention provides an optical pickup including: a diffraction grating, a beam splitter and laser beam guiding optical components that change direction of and converge laser beams, which are placed on a light path defined by a semiconductor laser that emits dual wavelength laser beams and an information recording surface of an optical disk, wherein a wavelength plate is further provided on a light path between said diffraction grating and said semiconductor laser so that a laser beam irradiated on the recording surface of said optical disk becomes an elliptically-polarized (including circularly-polarized) beam or a beam having a polarizing plane that produces an angle of 30–60 degrees relative to a radius direction.

Further, in optical pickup according to the present invention, said wavelength plate 1 can be ¼–¾ λ plates that include a ½ λ plate.

Further, in optical pickup according to the present invention, said wavelength plate is formed in such a way as to coincide with a plane of said diffraction grating.

It goes without saying that the reference codes shown above are used simply for the sake of the ease of the reader's understanding of the invention and the invention is not limited by them in any way.

BRIEF DESCRIPTION OF THE DRAWINGS

FIG. 9(a) is a plan view showing the general arrangement of each optical system that constitutes an optical pickup according to the prior art, while FIG. 9(b) is a view showing the polarization of an incident light on said optical disk according to the prior art.

DETAILED DESCRIPTION OF THE PREFERRED EMBODIMENTS

An embodiment of the invention will be described below with reference to the accompanying drawings.

Figure 1:
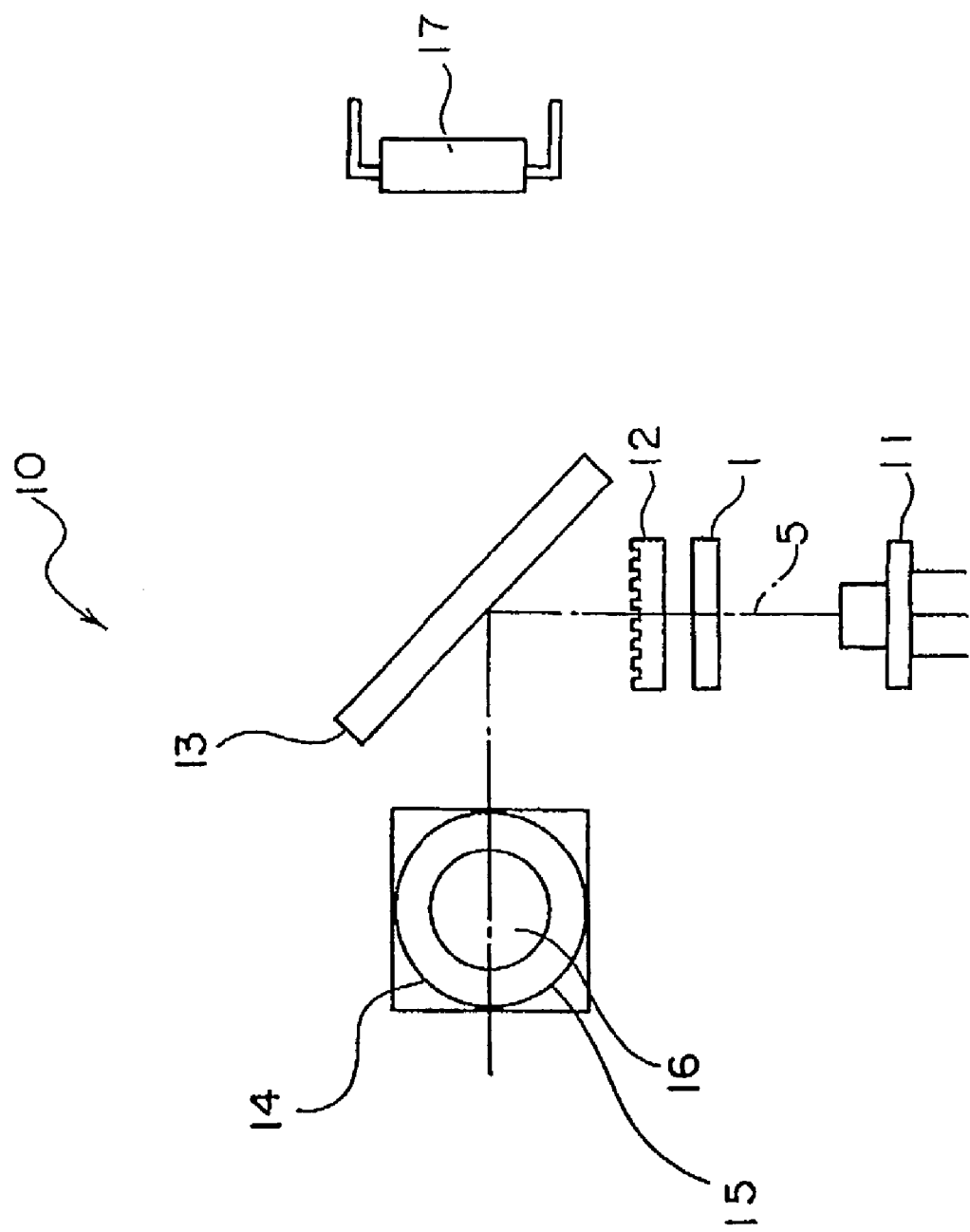
FIG. 1 is a plan view showing the general arrangement of each optical system that constitutes an optical pickup according to an embodiment of the present invention.
Figure 2:
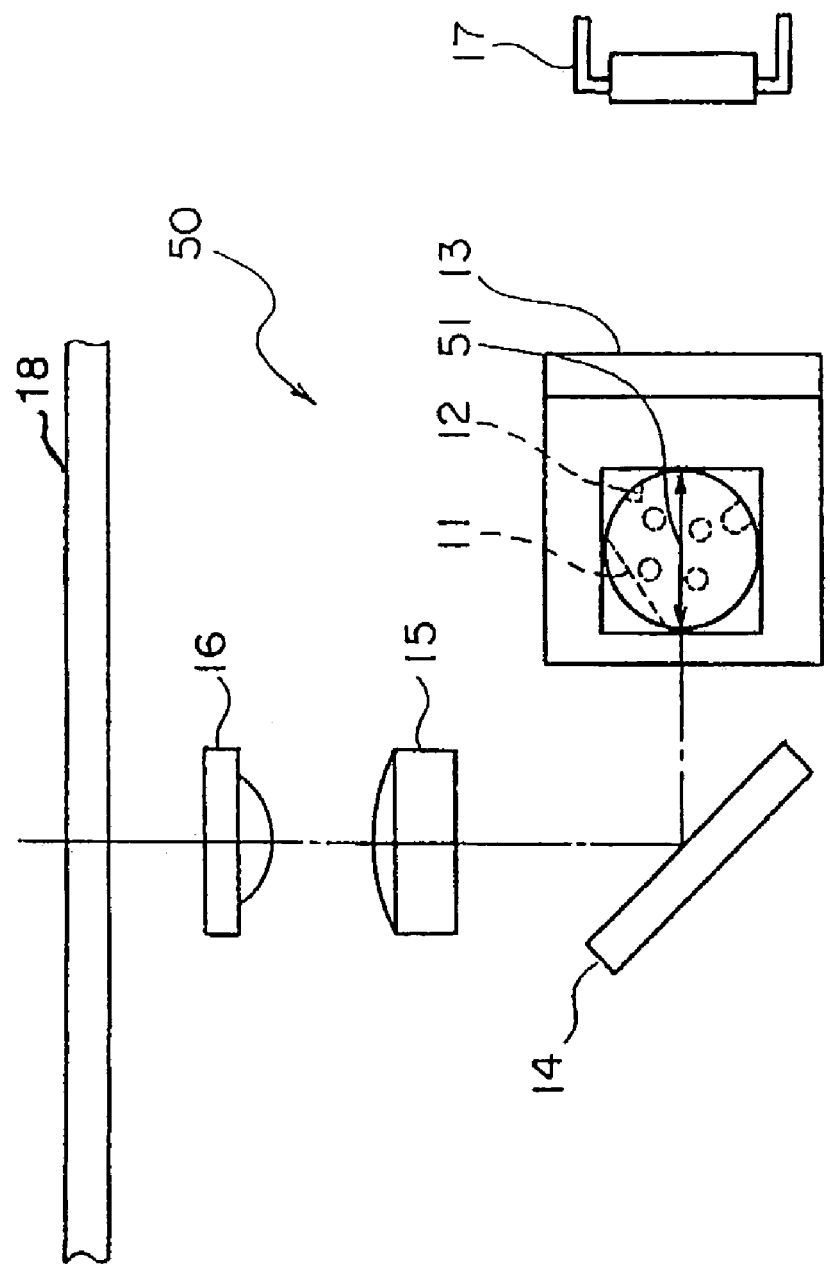
FIG. 2 is a side view of the arrangement of each optical system of said optical pickup indicated in FIG. 1.
Figure 3:
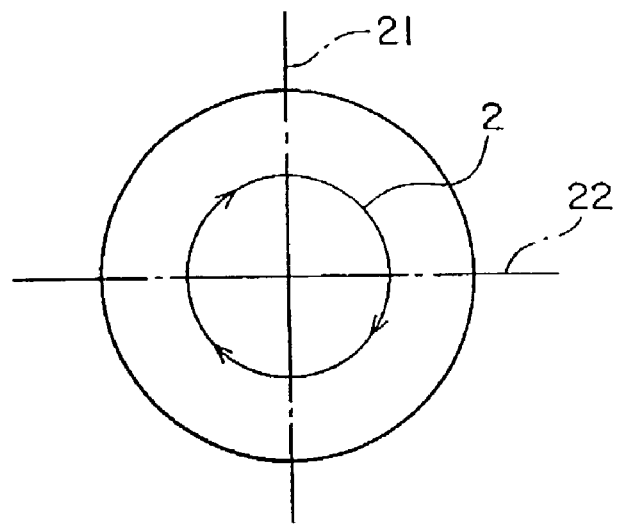
FIG. 3(a) shows an example of the optical pickup indicated in FIG. 1.
FIG. 3(b) shows another example the optical pickup indicated in FIG. 1.
Figure 3:
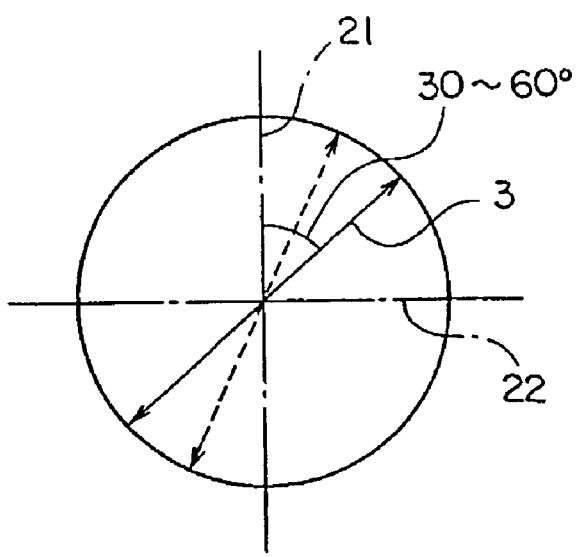
Figure 4:
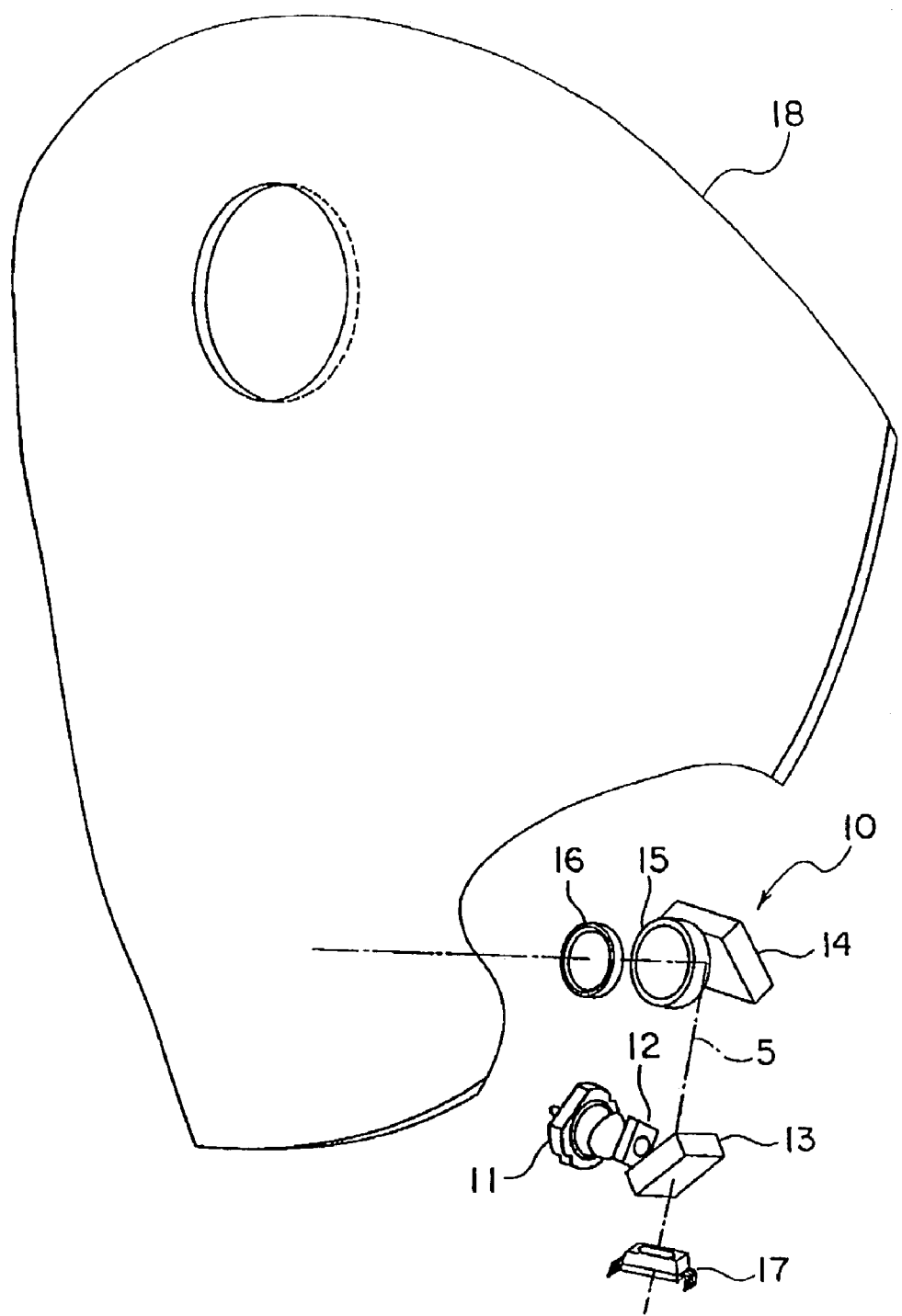
FIG. 4 is a perspective view of an example constitution of each optical system of the optical pickup indicated in FIG. 1.
Figure 5:
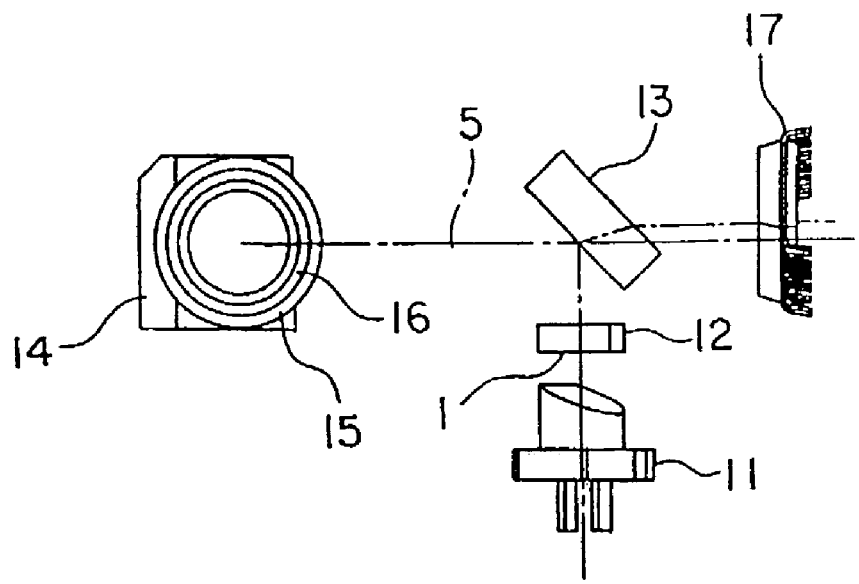
FIG. 5 is a plan view of the optical pickup indicated in FIG. 4.
Figure 6:
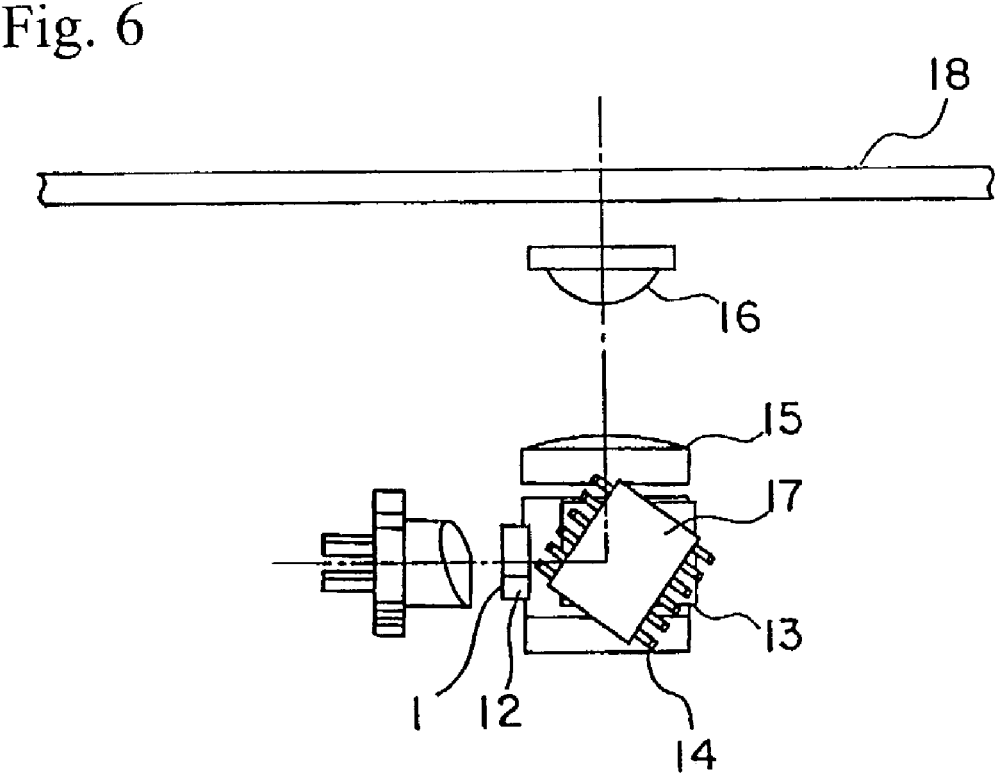
FIG. 6 is a plan view of the optical pickup viewed from a different angle.
Figure 7:
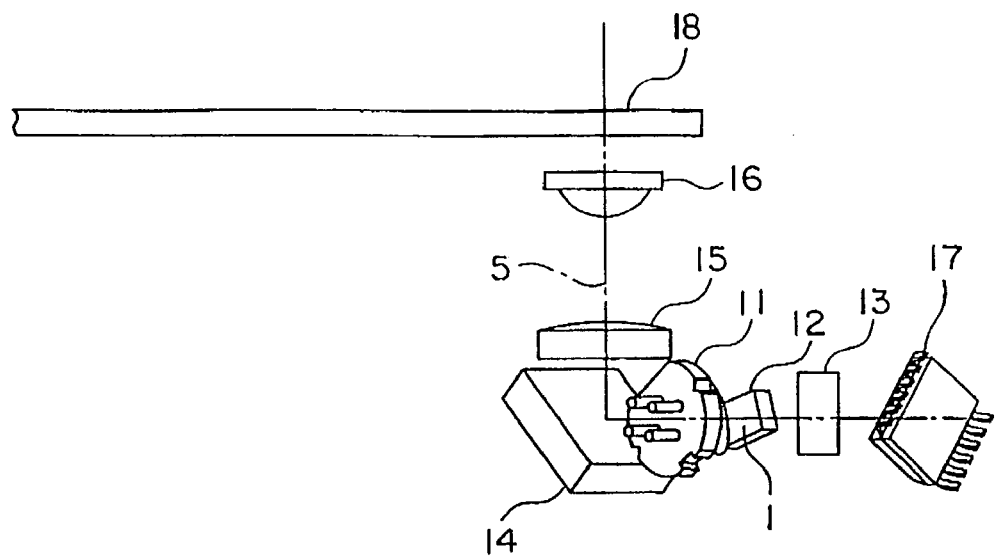
FIG. 7 is a plan view of the optical pickup viewed from a different angle.
Figure 8:
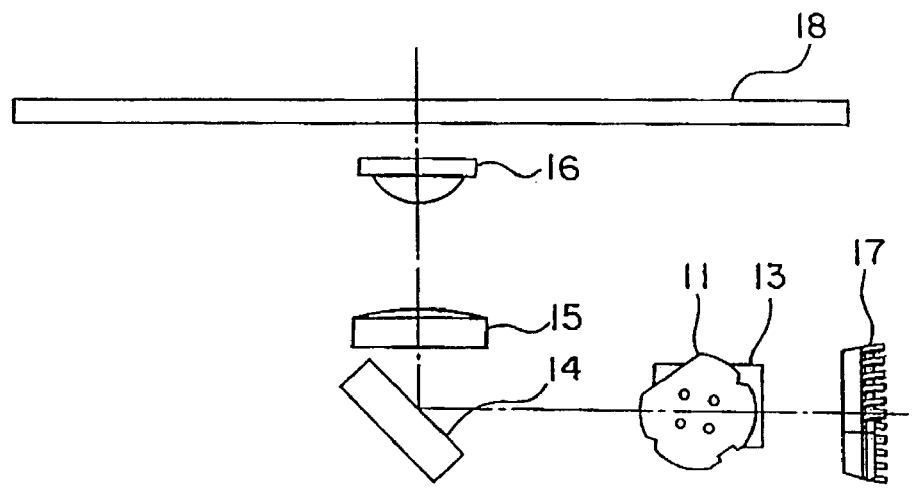
FIG. 8 is a plan view of the optical pickup indicated in FIG. 4 viewed from a different angle.
Figure 9:
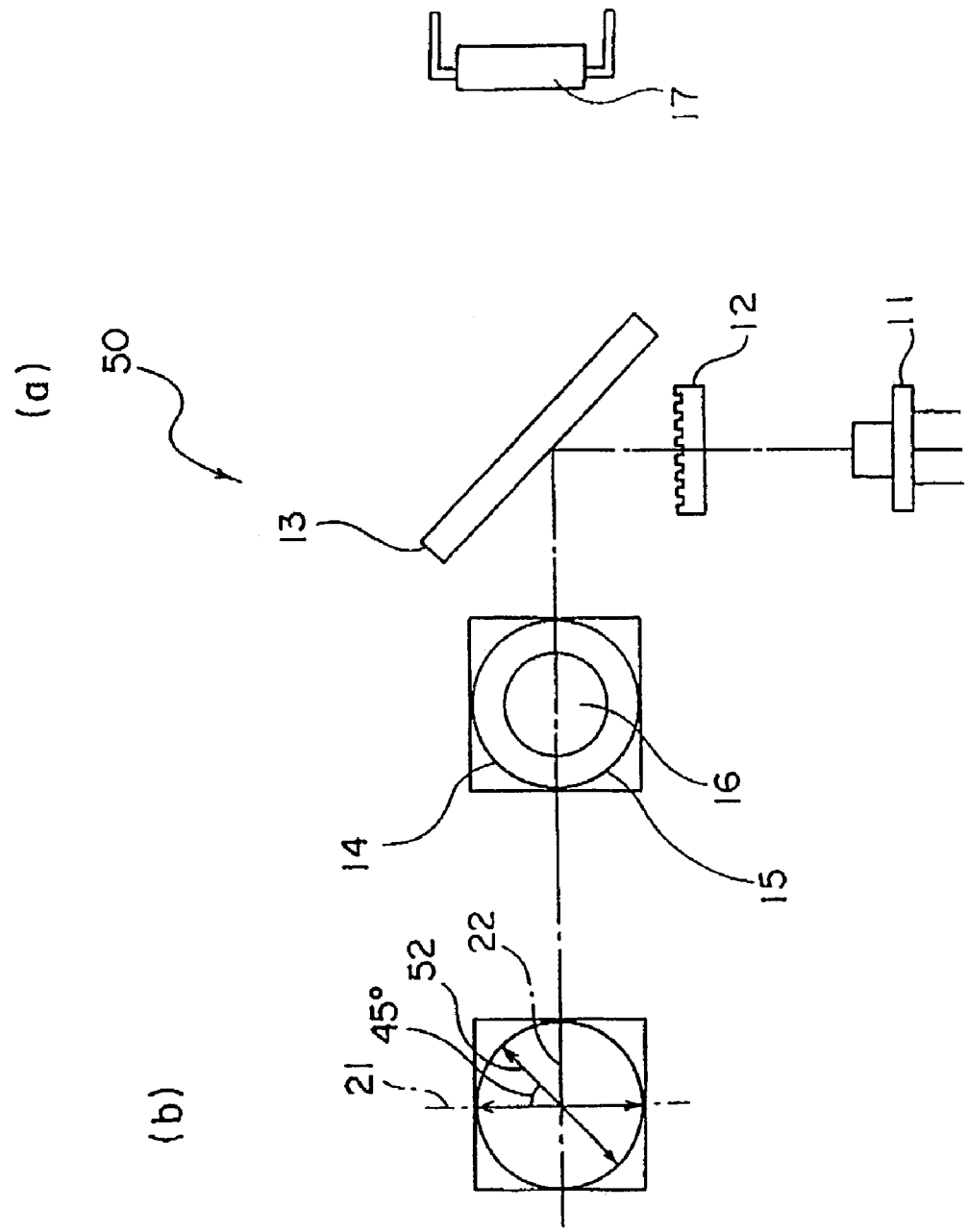
Figure 10:
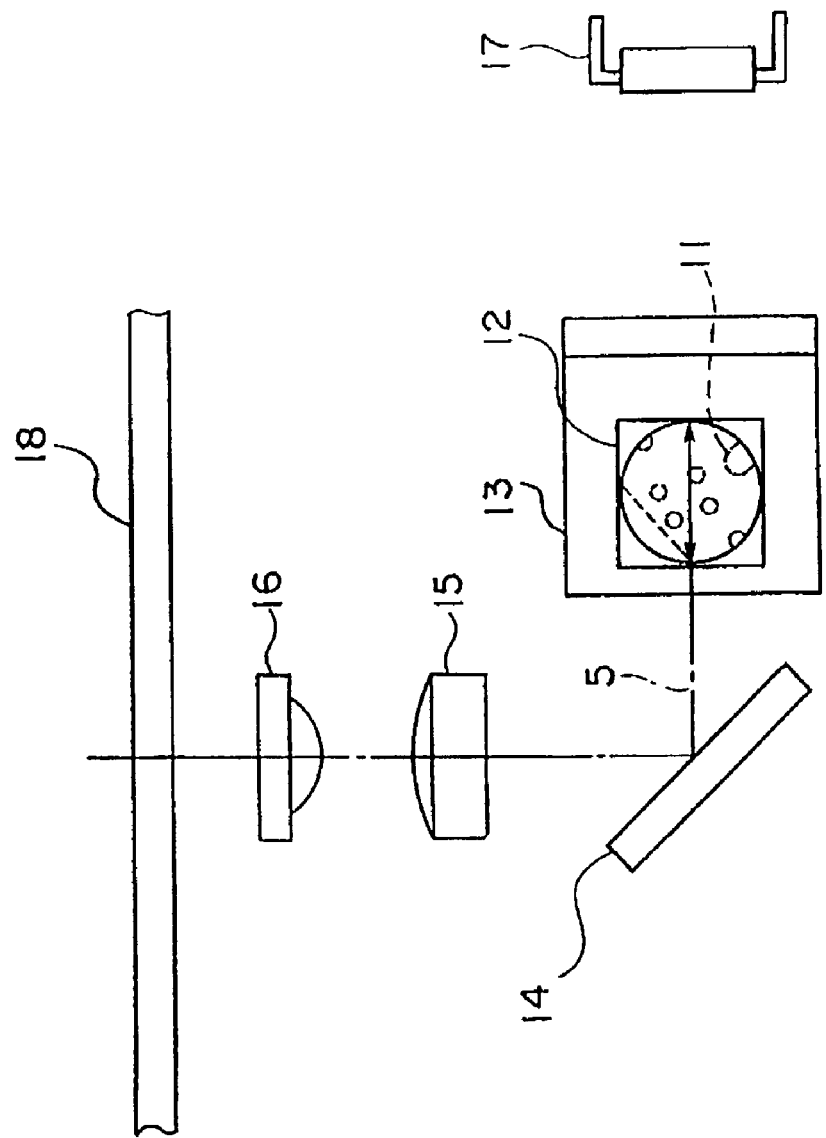
FIG. 10 is a side view of said optical pickup shown in FIG. 9 showing the arrangement of each optical system according to the prior art.

FIG. 1 is a plan view showing the general arrangement of each optical system that constitutes an optical pickup according to an embodiment of the present invention. FIG. 2 is a side view of the arrangement of each optical system of said optical pickup indicated in FIG. 1. FIG. 3(a) shows an example of the optical pickup indicated in FIG. 1, while FIG. 3(b) shows another example the optical pickup indicated in FIG. 1. FIG. 4 is a perspective view of an example constitution of each optical system of the optical pickup indicated in FIG. 1. FIG. 5 is a plan view of the optical pickup indicated in FIG. 4, while FIG. 6, FIG. 7, and FIG. 8 are plan views of the optical pickup indicated in FIG. 4 viewed from different angles.

The optical pickup shown in FIG. 1 and FIG. 2 comprises: a semiconductor laser ("LD") 11 that is capable of radiating dual wavelength laser beams; a wavelength plate ("PDP") 1 to which the laser beams from LD 11 enter; a diffraction grating ("GRT") 12 to which the laser beams polarized by wavelength plate 1; a beam splitter ("BS") 13 that reflects the laser beams from GRT 12; a photo detector ("PD") 17 placed on the direction opposite to the reflecting direction of BS 13; a raising mirror ("MIR") 14 for further reflecting the reflecting laser beams from B3 13; a collimate lens ("CL") 15 for converging the reflecting laser beams from MIR 14; and an objective lens ("OL") 16 for accepting the laser beams converged by CL 15 and radiating them focusing on the signal recording surface of optical disk 18.

As MIR 14, CL 15, and OL 16 are used to guide the laser beams to the signal recording surface of optical disk 18 as well as to guide the returning laser beams from the signal recording surface to BS 13, hereinafter they will be called laser beams guiding optical components.

The beams of two different wavelengths emitted by semiconductor laser 11 are used for reading the recorded signals of DVD disks and CD disks respectively.

In the optical pickup according to the embodiment of the present invention thus constituted, reading of signals recorded on optical disk 18 is done by first guiding the laser beams to enter into the signal recording surface. The returning laser beams from the signal recording surface of optical disk 18 are then guided by OL 16 and CL 15 to enter into MIR 14. At this point, the returning laser beams are reflected and diverted to enter BS 13, wherein the returning beams from the optical disk passes through BS 13 and enter photo detector ("PD") 17 of the light detecting device. PD 17 detects the change of intensity of the laser beams.

As shown in FIG. 3(a), ¼–¾ λ plates that convert linearly polarized beams to circularly or elliptically polarized beams can be used as wavelength plate ("PDP") 1. Also, as shown in FIG. 3(b), wavelength plate 1 can be a ½ λ plate that rotates the polarizing plane relative to the center axis so that its polarized plane produces a 30–60 degrees relative to a radius direction of the optical disk.

By using such a wavelength plate 1, the optical pickup having a substantially horizontal polarization plane such as the one shown in FIG. 2 can improve the playability even on an optical disk with a large double refraction.

FIG. 4 is a perspective view of an example constitution of each optical system of the optical pickup indicated in FIG. 1. FIG. 5 is a plan view of the optical pickup indicated in FIG. 4, while FIG. 6, FIG. 7, and FIG. 8 are plan views of the optical pickup indicated in FIG. 4 viewed from different angles.

In the example shown in FIG. 4 through FIG. 8, wavelength plate 1 is formed in such a way that it coincides with a surface of diffraction grating 12 on the side of semiconductor laser 11. In other words, optical pickup 10 comprises: a semiconductor laser ("LD") 11 that is capable of radiating dual wavelength laser beams; an optical element wherein a wavelength plate ("PDP") 1 to which the laser beams from LD 11 enter and a diffraction grating ("GRT") 12 to which the laser beams polarized by wavelength plate 1 are combined as a unit; a beam splitter ("BS") 13 that reflects the laser beams from said optical element; a photo detector ("PD") 17 placed on the direction opposite to the reflecting direction of BS 13; a raising mirror ("MIR") 14 for further reflecting the reflecting laser beams from BS 13; a collimate lens ("CL") 15 for converging the reflecting laser beams from MIR 14; and an objective lens ("OL") 16 for accepting the laser beams converged by CL 15 and radiating them focusing on the signal recording surface of optical disk 18. In reading signals recorded on an optical disk, laser beams first enter into the optical disk. The return laser beams from the signal reflecting surface travel again through OL 16 and CL 15, enter into and are reflected by MIR 14 into a different direction, and enter into BS 13. The return beams from the optical disk pass through BS 13, and enter into photo detector ("PD") 17 of the optical detector. PD 17 detects the change of intensities of the laser beams returning from the signal recording surface.

As can be seen from the above, in the example shown in FIG. 4 through FIG. 8, by forming wavelength plate 1 on one surface of GRT 12, it is possible to improve the playability even for an optical disk with a large double diffraction while maintaining the device a compact unit by rotating the linearly polarized beam to be modified to an elliptically polarized (including circularly polarized) beam or causing its polarization plane to produce 30–60 degrees relative to a radius direction of the optical disk.

As can be seen from the above, the present invention provides an optical pickup that does not deteriorate its playability when it is used for various types of optical disks.

What is claimed is:

1. An optical pickup comprising:
   a diffraction grating;
   a beam splitter;
   laser beam guiding optical components configured to change a direction of, and a convergence of, laser beams placed on a light path, wherein the light path is defined by a semiconductor laser that emits dual wavelength laser beams and an information recording surface of an optical disk having a radial direction; and
   a ½ λ wavelength plate provided on the light path between said diffraction grating and said semiconductor laser so that a polarization plane of the laser beams, irradiated on the recording surface of said optical disk, is rotated around a center axis to form an angle between 30 and 60 degrees relative to the optical disk radial direction.

2. An optical pickup described in claim 1, wherein said wavelength plate is formed in combination with said diffraction grating on one of its surface.

* * * * *